Figure 1:
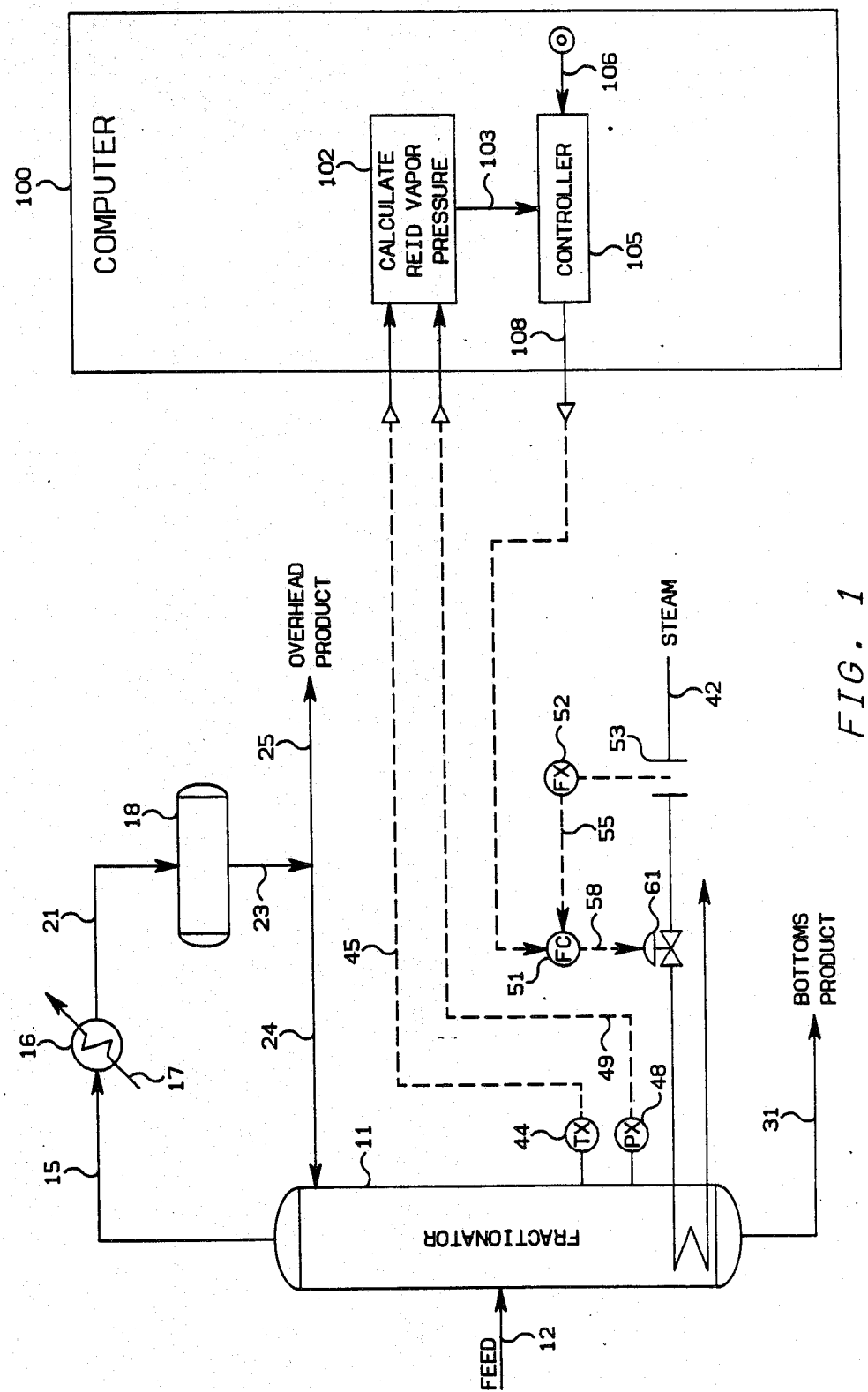

United States Patent [19]

Soderstrom, III et al.

[11] Patent Number: 4,667,508

[45] Date of Patent: May 26, 1987

[54] REID VAPOR PRESSURE DETERMINATION

[75] Inventors: Edwin D. Soderstrom, III; Terrence A. Davis, both of Bartlesville, Okla.

[73] Assignee: Phillips Petroleum Company, Bartlesville, Okla.

[21] Appl. No.: 808,145

[22] Filed: Dec. 11, 1985

Related U.S. Application Data

[62] Division of Ser. No. 401,424, Jul. 23, 1982, Pat. No. 4,578,151.

[51] Int. Cl.[4] .................. G01N 7/16; B01D 3/42
[52] U.S. Cl. .......................... 73/64.2; 201/1; 203/1
[58] Field of Search ............ 73/64.2, 29; 202/206; 201/1; 203/1, 2

[56] References Cited

U.S. PATENT DOCUMENTS

| | | | |
|---|---|---|---|
| 3,108,926 | 10/1963 | Tolin | 202/160 |
| 3,548,023 | 12/1970 | Mayhue | 208/67 |
| 3,901,062 | 8/1975 | Lynch et al. | 73/64.2 |
| 3,964,975 | 6/1976 | Harrison et al. | 196/132 |
| 4,332,159 | 6/1982 | Chin et al. | 73/64.2 |
| 4,522,056 | 6/1985 | Chin et al. | 73/64.2 |
| 4,578,151 | 3/1986 | Soderstrom, III et al. | 73/64.2 |

Primary Examiner—Stewart J. Levy
Assistant Examiner—Hezron E. Williams
Attorney, Agent, or Firm—P. S. Chirgott

[57] ABSTRACT

The Reid Vapor Pressure of a hydrocarbon mixture consisting essentially of hydrocarbons selected from the same series is determined based on the actual temperature and vapor pressure of the hydrocarbons mixture. The thus determined Reid Vapor Pressure may be compared to a set point for the Reid Vapor Pressure with the results of the comparison being utilized to maintain the actual Reid Vapor Pressure substantially equal to the desired Reid Vapor Pressure.

4 Claims, 1 Drawing Figure

REID VAPOR PRESSURE DETERMINATION

This application is a division of U.S. Pat. No. 4,578,151, filed July 23, 1982 and issued Mar. 25, 1986.

This invention relates to method and apparatus for determining the Reid Vapor Pressure for a mixture of hydrocarbons. In another aspect this invention relates to method and apparatus for maintaining a desired Reid Vapor Pressure for a mixture of hydrocarbons.

The Reid Vapor Pressure is defined as the equilibrium pressure of a fluid mixture at 100° F. The Reid Vapor Pressure is often specified for a particular process stream in a fractional distillation process such as the bottoms product stream or for a mixture of hydrocarbons contained in a tank. For a bottoms product stream, the Reid Vapor Pressure is a function of the concentration of light components in the bottoms product and thus it is an indication of the eificiency of the iractional distillation.

Generally, a determination of the Reid Vapor Pressure for a particular hydrocarbon mixture requires some type of analysis such as a chromatographic analysis of the hydrocarbon mixture or an analysis to determine some properties such as molecular weight and specific gravity. For a bottoms product stream, the chromatographic analysis would be of particular key light components. However, in many cases where it would be desirable to specify a Reid Vapor Pressure, a chromatographic analyzer or other type of analyzer required is not available. Thus, it would be desirable to be able to determine the Reid Vapor Pressure for a particular hydrocarbon mixture without an analysis.

It is thus an object of this invention to provide method and apparatus for determining the Reid Vapor Pressure of a hydrocarbon mixture without the need for an analysis of the hydrocarbon mixture. It is another object of this invention to provide method and apparatus for maintaining a desired Reid Vapor Pressure for a hydrocarbon mixture.

In accordance with the present invention, method and apparatus is provided for determining the Reid Vapor Pressure of a hydrocarbon mixture based on the actual temperature and vapor pressure of the hydrocarbon mixture. The thus determined Reid Vapor Pressure may be compared to a set point for the Reid Vapor Pressure with the results of the comparison being utilized to control a process variable so as to maintain the actual Reid Vapor Pressure substantially equal to the desired Reid Vapor Pressure. In this manner, the Reid Vapor Pressure specification may be met for a particular hydrocarbon mixture without the need for an analysis.

Other objects and advantages of the Invention will be apparent from the foregoing brief description of the invention and the claims as well as the detailed description of the drawing which is briefly described as follows:

FIG. 1 is a diagramatic illustration of a fractional distillation process and an associated control system which includes the calculation of Reid Vapor Pressure based on temperature and pressure.

The invention is described in terms of determining the Reid Vapor Pressure for a bottoms product stream withdrawn from a fractional distillation column and using the resulting determination to maintain a desired Reid Vapor Pressure for the bottoms product stream. However, the calculation of Reid Vapor Pressure is applicable to any suitable mixture of hydrocarbons.

The invention is also described in terms of a fractional distillation process utilized to separate aliphatic hydrocarbons. The invention is applicable to other separation processes but it is noted that the hydrocarbon mixture for which the Reid Vapor Pressure is determined must consist essentially of related series of hydrocarbons such as aliphatic hydrocarbons paraffinic hydrocarbons, or alcohols.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting iniormation. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Other types of computing devices could also be used in the invention. The digital computer used was an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurment signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a fractional distillation column 11. A feed stream consisting essentially of aliphatic hydrocarbons is supplied to the fractional distillation column 11 through conduit means 12. An overhead stream is withdrawn from the fractional distillation column 11 through conduit means 15 and is provided to the heat exchanger 16. The heat exchanger 16 is provided with a cooling medium flowing through conduit means 17. The condensed fluid stream from the heat exchanger 16 is provided to the overhead accumulator 18 through conduit means 21. Liquid in the accumulator 18 is withdrawn through conduit means 23. The fluid flowing through conduit means 23 is provided as an external reflux to the fractional distillation column 11 through the combination of conduit means 23 and 24. The fluid flowing through conduit means 23 is also provided as the overhead product stream from the fractional distillation column 11 through the combination of conduit means 23 and 25.

A bottoms product stream is withdrawn from the fractional distillation column 11 through conduit means 31. Heat is supplied to the fractional distillation column 11 by fluid (generally steam) flowing through conduit means 42.

The temperature and vapor pressure of the fluid in the lower portion of the fractional distillation column 11 is considered to be essentially equal to the temperature and vapor pressure of the bottoms product stream flowing through conduit means 31. Thus, a measurement of the temperature and vapor pressure of the fluid in the lower portion of the fractional distillation column 11 was utilized in the present invention to determine the Reid Vapor Pressure for the bottoms product stream but it is noted that the temperature and vapor pressure measurements could have been taken for the bottoms product stream if desired.

Temperature transducer 44 in combination with a temperature sensing device such as a thermocouple, which is operably located in the lower portion of the fractional distillation column 11, provides an output signal 45 which is representative of the temperature of the fluid in the lower portion of the fractional distillation column 11 and thus of the temperature of the bottoms product stream flowing through conduit means 31. Signal 45 is provided from the temperature transducer 44 as an input to computer 100 and is specifically provided to the calculate Reid Vapor Pressure block 102.

Pressure transducer 48 in combination with a pressure sensing device, which is operably located in the fractional distillation column 11, provides an output signal 49 which is representative of the vapor pressure of the fluid in the lower portion of the fractional distillation column 11 and thus of the vapor pressure of the bottoms product stream flowing through conduit means 31. Signal 49 is provided from the pressure iransducer 48 as a second input to the calculate Reid Vapor Pressure block 102.

In response to signals 45 and 49, the actual Reid Vapor Pressure for the bottoms product stream flowing through conduit means 31 is calculated as will be more fully described hereinafter. Signal 103, which is representative of the actual Reid Vapor Pressure for the bottoms product stream flowing through conduit means 31, is provided from the calculate Reid Vapor Pressure block 102 as the process variable input to the controller block 105.

The controller block 105 is also provided with signal 106 which is representative of the desired Reid Vapor Pressure for the bottoms product stream flowing through conduit means 31. In response to signals 103 and 106, the controller block 105 provides an output signal 108 which is responsive to the difference between signals 103 and 106. Signal 108 is scaled so as to be representative of the flow rate of steam through conduit means 42 required to maintain the actual Reid Vapor Pressure of the bottoms product stream substantially equal to the desired Reid Vapor Pressure represented by signal 106. Signal 108 is provided from computer 100 as the set point signal to the flow controller 51.

It is possible to manipulate the Reid Vapor Pressure of the bottoms product stream by manipulating the flow of steam or heat to the fractional distillation column since the rate at which heat is supplied to the fractional distillation column is a major factor in the separation achieved and the Reid Vapor Pressure of the bottoms product stream is a function of that separation.

Flow transducer 52 in combination with the flow sensor 53, which is operably located in conduit means 42, provides an output signal 55 which is representative of the actual flow rate of steam through conduit means 42. Signal 55 is provided as the process variable input to the flow controller 51. In response to signals 108 and 55, the flow controller 51 provides an output signal 58 which is responsive to difference between signals 108 and 55. Signal 58 is scaled so as to be representative of the position of the control valve 61, which is operably located in conduit means 42, required to maintain the actual flow rate of steam through conduit means 42 substantially equal to the desired flow rate represented by signal 108. Signal 58 is provided from the flow controller 51 as a control signal to the control valve 61 and the control valve 61 is manipulated in response thereto to thereby maintain the actual Reid Vapor Pressure of the bottoms product stream substantially equal to a desired Reid Vapor Pressure.

A vapor pressure chart such as that supplied by the Natural Gas Processors Suppliers Association is utilized to calculate the Reid Vapor Pressure in accordance with the present invention. Such vapor pressure charts plot vapor pressure (psia) as a function of temperature (°F.). Vapor pressure is plotted on a $\log_{10}$ scale while temperature is plotted on a hyperbolic scale. When plotted in this manner, the vapor pressure of a particular fluid as a function of temperature will be approximately a straight line. Also it has been found that for a particular series of hydrocarbons such as aliphatic hydrocarbons, all lines for the series will converge at a common point.

In order to calculate the Reid Vapor Pressure in a digital computer using a vapor pressure chart, it is convenient to derive an equation which converts temperature from a hyperbolic form to a linear form. This may be accomplished by measuring the distance between a particular temperature which is selected as a reference on a particular vapor pressure chart and other temperatures on that chart. For the particular vapor pressure chart utilized, the distances in centimeters were as set forth in Table 1 with $-100°$ F. being used as a reference.

TABLE 1

| TEMP (°F.) | DISTANCE ON X ORDINATE (Cm) |
|---|---|
| −100.00000 | 0. |
| −50.00000 | 5.85 |
| 0. | 10.55 |
| 50.00000 | 14.28 |
| 100.00000 | 17.42 |
| 150.00000 | 20.05 |
| 200.00000 | 22.28 |
| 250.00000 | 24.12 |
| 300.00000 | 25.75 |
| 350.00000 | 27.15 |
| 400.00000 | 28.32 |
| 450.00000 | 29.38 |
| 500.00000 | 30.25 |
| 550.00000 | 31.10 |
| 600.00000 | 31.55 |

For the distances set forth in Table 1, any temperature may be converted to a linear scale using equation 1

$$(1) \quad T_L = (C1 + C2 \ast T_A)/(1.0 + C3 \ast T_A) \tag{1}$$

where
$T_L$ = the linearized temperature;
$T_A$ = actual temperature (signal 45);
C1 = 10.6732;
C2 = 0.108698; and
C3 = 0.002390036.

Vapor pressure can be converted to a linear scale by taking the $\log_{10}$ of the actual vapor pressure. Thus the linearized vapor pressure is determined in accordance with equation 2

$$(2) \quad P_L = \text{LOG}_{10} P_A \tag{2}$$

where
$P_L$ = the linearized vapor pressure; and
$P_A$ = vapor pressure (signal 49).

On the the temperature scale of the particular vapor pressure chart utilized, the point of convergence of the vapor pressure lines was 42.39 centimeters from the reference of $-100°$ F. Also, the logarithm of the vapor pressure for the point of convergence was 4.7952. Thus, the slope of a line extending from the point determined by the actual measured pressure and temperature and the point of convergence is given by equation 3.

$$(3) \quad \text{SLOPE} = (4.7952 - P_L)/(42.39 - T_L) \tag{3}$$

The intercept of this line at $-100°$ F. (B) is given by equation 4 which is standard slope intercept form $$(4) \quad B = 4.7952 - 42.39 \ast \text{SLOPE} \tag{4}$$

The actual vapor pressure at $100°$ F. ($P_{100}$) may then be calculated using equation 5

$$(5) \quad P_{100} = 10.0 \ast\ast (17.42 \ast \text{SLOPE} + B)$$

where 17.42 is the distance on the temperature axis between $-100°$ F. and $100°$ F. as shown in Table 1. Essentially equation 5 is again slope intercept form but since vapor pressure is plotted on a logarithmic scale, it is necessary to convert to a logarithmic scale.

Using the above method, the vapor pressure from a mixture of aliphatic hydrocarbons can be determined at $100°$ F. based on a single measurement of the vapor pressure at any temperature. Thus, a method is provided for calculating the Reid Vapor Pressure for a process stream without the need for an analysis.

The invention has been described in terms of a preferred embodiment as illustrated in FIG. 1. Specific components used in the practice of the invention as illustrated in FIG. 1 such as temperature transducer 44, pressure transducer 48, flow transducer 52, flow controller 51, flow sensor 53 and control valve 61 are each well known, commercially available control components such as are described at length in Perry's Chemical Engineers Handbook, 4th. ed., Chapter 22, McGraw-Hill.

For reasons of brevity, conventional auxilliary fractionation equiptment such as pumps, heat exchangers, additional measurement-control devices, etc. have not been included in the above description as they play no part in the explanation of the invention.

While the invention has been described in terms of the presently preferred embodiment, reasonable variation and modifications are possible by those skilled in the art and such variations and modifications are within the scope of the described invention and the appended claims.

That which is claimed is:
1. Apparatus comprising:
means for establishing a first signal representative of the temperature of a mixture of hydrocarbons, wherein said mixture consists essentially of hydrocarbons selected from the same series;

means for establishing a second signal representative of the vapor pressure of said mixture; and means for determining the actual Reid Vapor Pressure of said mixture response to said first and second signals, wherein an analysis of said mixture is not utilized to determine said Reid Vapor Pressure.

2. Apparatus in accordance with claim 1 wherein said means for determining the Reid Vapor Pressure of said mixture in response to said first and second signals comprises:

means for determining the slope of a line on a vapor pressure chart extending from the point determined by said first and second signals and the point of convergence for vapor pressure lines on said vapor pressure chart for the hydrocarbons in said mixture, wherein said vapor pressure chart is a plot of vapor pressure on a $\log_{10}$ scale as a function of temperature on a hyperbolic scale;

means for determining the intercept of said line at a reference temperature on said vapor pressure chart; and means for determining the actual Reid Vapor Pressure of said mixture based on the slope on said line and the intercept of said line at 3. A method for determining the Reid Vapor Pressure of a mixture of hydrocarbons, wherein said mixture consists essentially of hydrocarbons selected from the same series, said method comprising the steps of:

establishing a first signal representative of the temperature of said mixture;

establishing a second signal representative of the vapor pressure of said mixture; and determining the actual Reid Vapor Pressure of said mixture in response to said first and second signals, wherein an analysis of said mixture is not utilized to determine said Reid Vapor Pressure.

4. A method in accordance with claim 3 wherein said step of determining the Reid Vapor Pressure of said mixture in response to said first and second signals comprises:

determining the slope of a line on a vapor pressure chart extending from the point determined by said first and second signals and the point of convergence for vapor pressure lines on said vapor pressure chart for the hydrocarbons in said mixture, wherein said vapor pressure chart is a plot of vapor pressure on a $\log_{10}$ scale as a function of temperature on a hyperbolic scale;

determining the intercept of said line at a reference temperature on said vapor pressure chart; and determining the actual Reid Vapor Pressure of said mixture based on the slope of said line and the intercept of said line at said reference temperature.

* * * * *